June 5, 1923.   1,457,948
A. F. STOCKWELL
FOLDING, NONSKID ARMOR EQUIPMENT FOR AUTOMOBILE TIRES
Filed Feb. 12, 1923   2 Sheets-Sheet 2
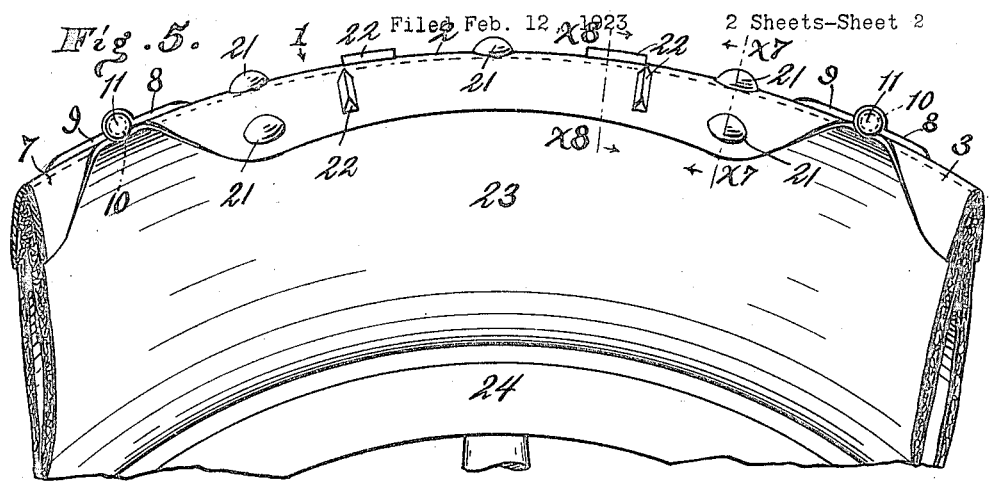
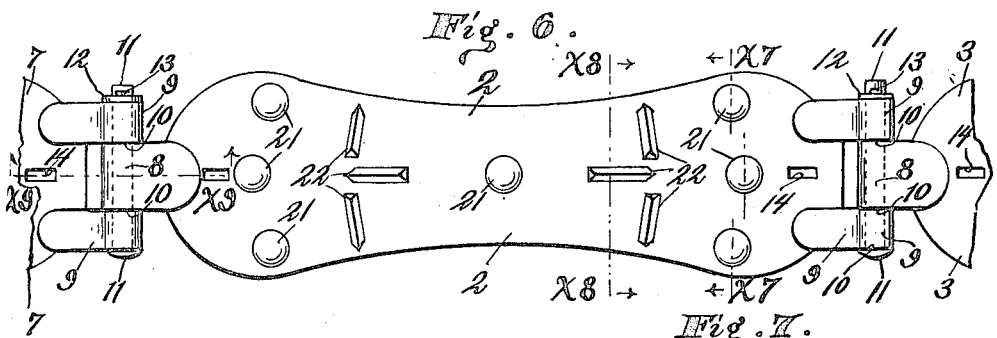
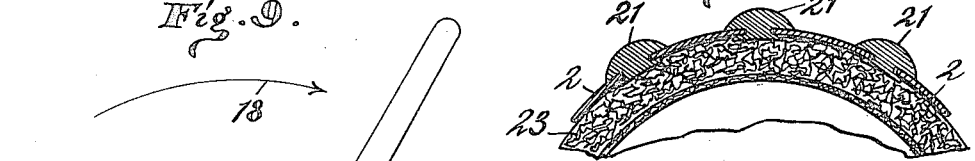
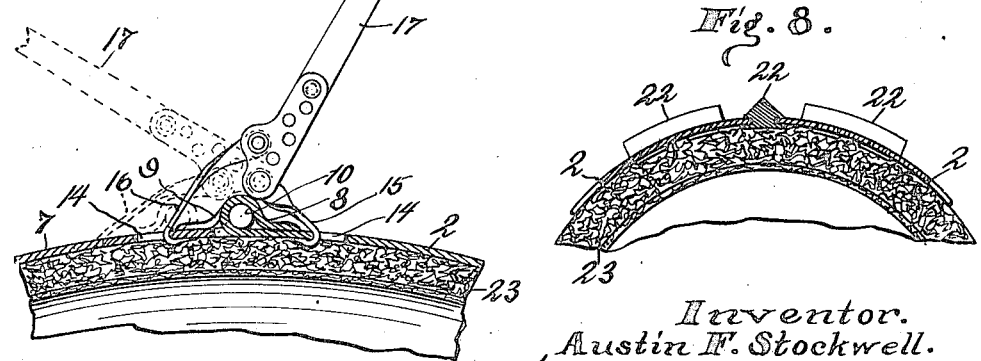
Inventor.
Austin F. Stockwell.
Witness:

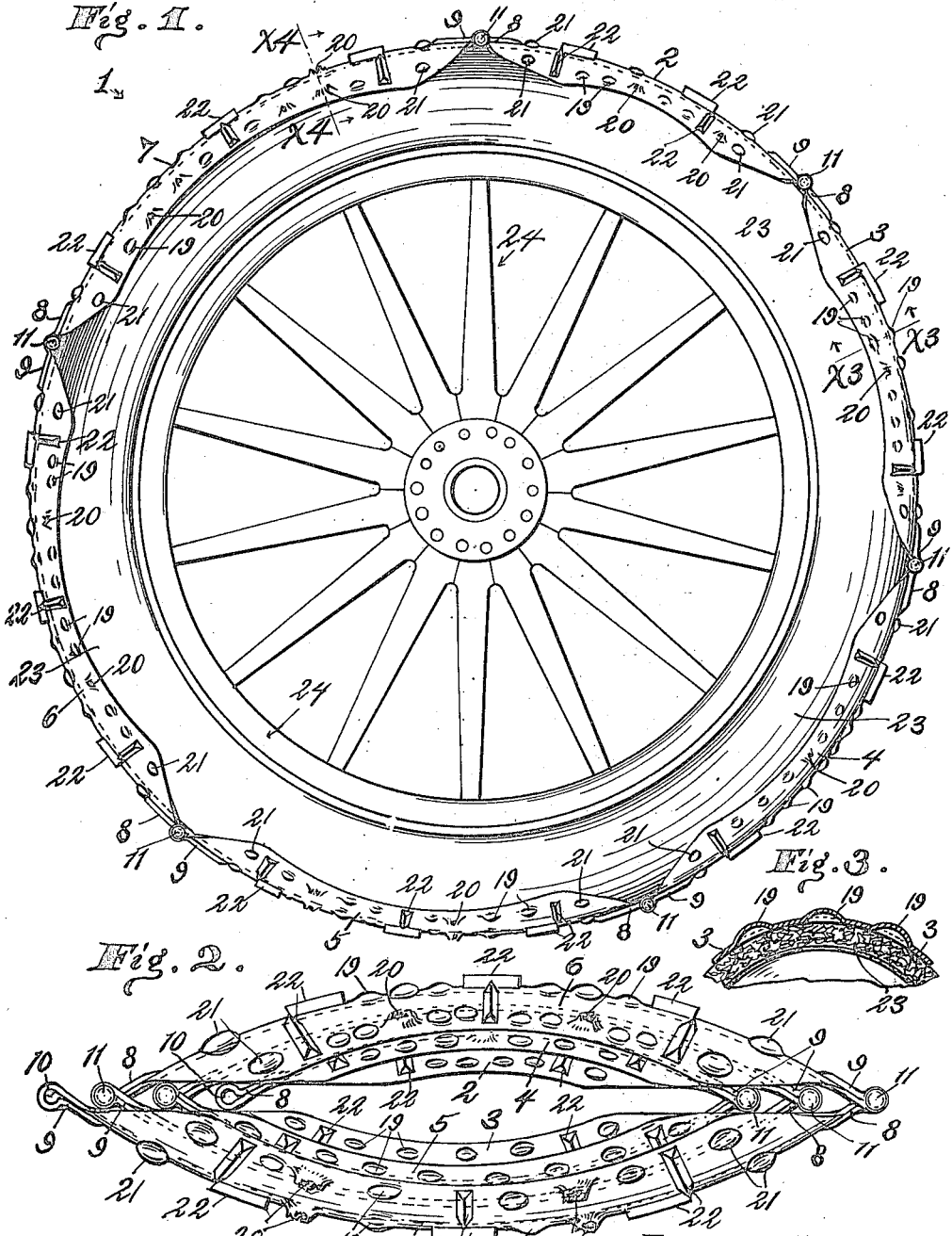

Patented June 5, 1923.

1,457,948

UNITED STATES PATENT OFFICE.

AUSTIN F. STOCKWELL, OF LOS ANGELES, CALIFORNIA.

FOLDING, NONSKID ARMOR EQUIPMENT FOR AUTOMOBILE TIRES.

Application filed February 12, 1923. Serial No. 618,543.

*To all whom it may concern:*

Be it known that I, AUSTIN F. STOCKWELL, a citizen of the United States, residing at Los Angeles, in the county of Los Angeles and State of California, have invented a new and useful Folding, Nonskid Armor Equipment for Automobile Tires, of which the following is a specification.

This invention relates to appliances for armoring the tread surfaces of automobile tires so that they will engage smooth, slick surfaces without skidding; and an object of this invention is to provide an appliance that will prevent a tire from skidding and which is detachable so that when not in use it can be folded up into a small space and stored under an automobile seat entirely out of the way where it is accessible again when needed.

An object of the invention is to provide a shield that can be easily attached and detached without deflating a tire. To that end I provide a link shield with hinged joints that have removable pivot pins; and I provide means for applying force to move the knuckles of the adjacent disconnected links into register so that a pivot pin can be inserted through the openings of the knuckles and secured in place while the tire to which the shield is fitted is fully inflated; also this same means is employed for releasing the tension on a pivot pin so that it can be easily removed to release the shield from the tire.

Another object of the invention is to provide a resilient metallic shield that will protect the tread surface of tires from puncture by sharp objects such as rocks, glass, nails and tacks.

Another object is to provide a shield of cheap and durable construction that can be easily and quickly connected and disconnected to and from a tire.

Other objects, advantages and features of invention may appear from the accompanying drawings, the subjoined description and the appended claims.

The accompanying drawings illustrate the invention.

Figure 1 is a side view of a non-skid shield constructed in accordance with this invention; showing it as applied to the tread surface of an automobile tire.

Fig. 2 is an enlarged side view of the shield in folded position.

Fig. 3 is an enlarged fragmental cross section on line $X^3$, Fig. 1 showing projections on the tread face of the shield formed by stamping.

Fig. 4 is an enlarged fragmental cross section on line $X^4$, Fig. 1 showing ragged projection on the tread face of the shield formed by a stamp plunger that breaks entirely through the metal.

Fig. 5 is an enlarged fragmental side view of the shield attached to a tire.

Fig. 6 is a fragmental plan view of the shield shown in Fig. 5 detached from the tire.

Fig. 7 is an enlarged fragmental cross section on lines $X^7$, Figs. 5 and 6.

Fig. 8 is an enlarged fragmental cross section on lines $X^8$, Figs. 5 and 6.

Fig. 9 is a section on line $X^9$, Fig. 6 showing the means for moving the disconnected knuckles of adjacent links into register when the shield is to be fitted to an inflated tire.

The appliance comprises a folding shield 1 that is preferably formed of six links 2, 3, 4, 5, 6, 7 that are of different lengths so that when not in use the shield can be folded in a compact form as shown in Fig. 2. That is link 2 is shorter than link 3; and link 3 of less length than link 4; and 4 less than 5, 5 less than 6 and 6 less than 7; so that when not in use link 2 is folded toward link 3 so that their inside surfaces are adjacent and the folding in that order is continued until the link 2 is over-laid by 4 and 4 by 6; and the link 3 is over-laid by 5 and 5 by 7; or as shown folded in Fig. 2.

The links are of sheet metal concaved to fit on the periphery of an inflated tire and are provided with the hinge knuckles 8, 9 with openings 10 that are adapted to register and through which are extended the removable pins 11; and pins 11 are held in place by washers 12 and cotter pins 13; see Fig. 6.

Adjacent the ends of all the links are holes 14 through which are inserted gripping hooks 15, 16 of a lever 17 that is used for moving the knuckles 8, 9 into register when the pin 11 is to be inserted or removed for the purpose of attaching or detaching the shield.

The links of the shield are formed in proper lengths for tightly encircling tires of standard make. That is the inner periphery of the shield is slightly less in circumference than the outer periphery of a tire when it is inflated for use; so that considerable force is required to move the knuckles of the disconnected links into register when the shield is to be fitted to a tire; and for that reason the lever 17 is supplied.

When a shield is to be fitted to a tire on an automobile the wheel is jacked up so that the chain of connected links can be fitted to the tread surface of the tire with the knuckles of the disconnected links adjacent but not quite in register. Then the gripping hooks 15, 16 are inserted in the holes 14 with the lever in the dotted position shown in Fig. 9; then the lever is moved in the direction of the arrow 18 toward the full line position of the lever 17 until the holes 10 of the knuckles 8, 9 register; or until the pin 11 can be inserted in the holes 10 and secured in place; after which the lever 17 can be disconnected, leaving the shield under sufficient tension on the tire to prevent it slipping.

The tread surface of the shield can be armored with various protrusions to prevent skidding and to grip smooth surfaces; and preferably the protrusions are formed integral with the links of the shield. That is when the link blanks are heated and placed in a stamp machine to be struck into form to fit the tread surface of a tire, the protrusions 19, 20 are punched outward by protrusions on the stamp die, not shown. These protrusions of the shield can be semi-spherical as indicated in Fig. 3, or they can be punched entirely through the metal with ragged edges as shown in Fig. 4. For ordinary roads the protrusions 19 are sufficient to prevent skidding; but on ice-covered roads the ragged edges are preferred.

I also provide other gripping extensions 21, 22 that are riveted to the links. The extensions 21 are semi-spherical; and they can be sharpened spines if desired.

The extensions 22 are sharpened wedges that can be arranged to grip the road way and aid in propulsion of an automobile; and also arranged to resist side thrust to the wheels and prevent skidding. For the purpose of illustration, the drawings show many of the links of the shield provided with all of the protrusions 19, 20, 21, 22; but it is understood that shields can be made with protrusions of any desired selection. That is for use in ordinary travel shields can be made with protrusions 19, 21 properly arranged on their tread surface; and for very heavy pulling or use on ice shield provided with the protrusions 20, 22 can be employed.

In practice the shield is attached to a tire 23 of an automobile wheel 24 as shown and described; and when not in use is folded into a small compact form in which it can be stored under an automobile seat until needed.

I claim.

1. A folding non-skid shield for automobile tires comprising pivotally connected links that differ in lengths that are adapted to encircle and fit the tread surface of a tire.

2. A folding non-skid shield for automobile tires, comprising pivotally connected links that differ in lengths and that are adapted to be fitted to the tread surface of a tire said links adapted to fold into a small compact space when not in use.

3. Armor for pneumatic tires comprising resilient concave sheet metal links hinged together and of different lengths to allow the links to be compactly folded.

4. Armor for pneumatic tires comprising a band formed of concave links of resilient sheet metal hinged to encircle a tire, and being of different lengths to be folded together and having a removable hinge pin to allow the band to be removed and replaced.

In testimony whereof, I have hereunto set my hand at Los Angeles, California, this 2nd day of February, 1923.

AUSTIN F. STOCKWELL.

Witness:
JAMES R. TOWNSEND.